(12) United States Patent
Tian (10) Patent No.: US 12,355,531 B2
(45) Date of Patent: Jul. 8, 2025

(54) CHANNEL DATA TRANSMISSION METHOD AND APPARATUS, COMMUNICATION DEVICE, AND STORAGE MEDIUM

(71) Applicant: GUANGDONG OPPO MOBILE TELECOMMUNICATIONS CORP., LTD., Guangdong (CN)

(72) Inventor: Wenqiang Tian, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 190 days.

(21) Appl. No.: 18/349,690

(22) Filed: Jul. 10, 2023

(65) Prior Publication Data

US 2023/0353216 A1 Nov. 2, 2023

Related U.S. Application Data

(63) Continuation of application No. PCT/CN2021/071587, filed on Jan. 13, 2021.

(51) Int. Cl.
*H04L 5/12* (2006.01)
*H04B 7/06* (2006.01)
*H04B 17/336* (2015.01)

(52) U.S. Cl.
CPC ......... *H04B 7/0626* (2013.01); *H04B 17/336* (2015.01)

(58) Field of Classification Search
CPC ............................ H04B 7/0626; H04B 17/336
USPC ................ 375/262, 260, 259, 219, 295, 316
See application file for complete search history.

(56) References Cited

U.S. PATENT DOCUMENTS

| 2014/0323144 | A1 | 10/2014 | Kim et al. |
| 2020/0076490 | A1 | 3/2020 | Onggosanusi et al. |
| 2020/0313831 | A1 | 10/2020 | Kim et al. |
| 2022/0200896 | A1* | 6/2022 | Zhou ................ H04L 45/124 |

FOREIGN PATENT DOCUMENTS

| CN | 105142177 | 12/2015 |
| CN | 111435862 | 7/2020 |
| WO | 2016134585 | 9/2016 |

OTHER PUBLICATIONS

Vivo, "Study on AI based PHY layer enhancement for Rel-18," 3GPP TSG-RAN WG Meeting #90-e, RP-202650, Dec. 2020.

(Continued)

*Primary Examiner* — Zewdu A Kassa
(74) *Attorney, Agent, or Firm* — Hodgson Russ LLP (57) ABSTRACT

The present application relates to the technical field of communications, and discloses a channel data transmission method and apparatus, a communication device, and a storage medium. The method is applied to a terminal device, and comprises: obtaining channel data acquisition indication information, the channel data acquisition indication information comprising at least one of acquisition time and data structure information, and the data structure information being used for indicating at least one of a data type and a data format; performing channel data acquisition according to the channel data acquisition indication information to obtain channel data, the channel data being used for indicating a channel state; and transmitting the channel data to a second node device.

20 Claims, 6 Drawing Sheets

(56) References Cited

OTHER PUBLICATIONS

Wen et al., "Deep Learning for Massive MIMO CSI Feedback," IEEE Wireless Communications Letters, Oct. 2018, vol. 7, No. 5.
"3rd Generation Partnership Project; Technical Specification Group Radio Access Network; NR; Physical layer procedures for control (Release 16)," 3GPP TS 38.213, Sep. 2020, v16.3.0.
"3rd Generation Partnership Project; Technical Specification Group Radio Access Network; NR; Physical layer procedures for data (Release 16)," 3GPP TS 38.214, Sep. 2020, v16.3.0.
"3rd Generation Partnership Project; Technical Specification Group Radio Access Network; NR; Physical channels and modulation (Release 16)," 3GPP TS 38.211, Sep. 2020, v16.3.0.
WIPO, International Search Report and Written Opinion for PCT/CN2021/071587, Sep. 28, 2021.
EPO, Extended European Search Report for EP Application No. 21918307.6, Feb. 6, 2024.
NTT Docomo, Inc., "Update CSI-MeasConfig," 3GPP TSG-RAN WG5 Meeting #80, R5-185047, Aug. 2018.

* cited by examiner

CHANNEL DATA TRANSMISSION METHOD AND APPARATUS, COMMUNICATION DEVICE, AND STORAGE MEDIUM

CROSS REFERENCE

The present application is a continuation of International Application No. PCT/CN2021/071587, filed Jan. 13, 2021, the entire disclosure of which is incorporated herein by reference.

TECHNICAL FIELD

The present disclosure relates to the technical field of communication, and in particular to a channel data transmission method, device, communication device and storage medium.

BACKGROUND

The terminal device generally generates Channel State Information (CSI) feedback information by measuring channel state information.

In related technologies, the base station is required to configure a CSI reference signal and parameters to be fed back, and the terminal device generates the CSI information by performing CSI measurement, and then feeds back the generated CSI information to the base station. That is: which information among the CQI (Channel Quality Indicator), PMI (Precoding Matrix Indicator), RI (Rank Indicator) and other information is instructed to be obtained by the base station configuration, and sent to the terminal, and the terminal measures the corresponding information, generates channel data, and feeds back the corresponding channel data to the base station.

SUMMARY

Embodiments of the present application provide a channel data transmission method, device, communication device, and storage medium.

According to one aspect of the present application, a channel data transmission method is provided, which is applied to a first node device, and the method includes:
  obtaining channel data collection indication information, the channel data collection indication information includes at least one of collection time and data structure information; the data structure information is used to indicate at least one of data type and data format;
  collecting channel data according to the channel data collection indication information to obtain the channel data; the channel data is used to indicate channel state; and
  transmitting the channel data to a second node device.

According to one aspect of the present application, a channel data transmission device is provided, which is applied to a first node device, and the device includes:
  an information obtaining module, configured to obtain channel data collection indication information, the channel data collection indication information includes at least one of collection time and data structure information; the data structure information is used to indicate at least one of data type and data format;
  a data obtaining module, configured to collect channel data according to the channel data collection indication information to obtain the channel data; the channel data is used to indicate channel state; and
  a data transmission module, configured to transmit the channel data to a second node device.

According to one aspect of the present application, a terminal device is provided, in which a first node device includes: a processor and a transceiver connected to the processor, wherein,
  the transceiver is configured to obtain channel data collection indication information, the channel data collection indication information includes at least one of collection time and data structure information; the data structure information is used to indicate at least one of data type and data format;
  the processor is configured to collect channel data according to the channel data collection indication information to obtain the channel data; the channel data is used to indicate channel state; and
  the transceiver is further configured to transmit the channel data to a second node device.

According to one aspect of the present application, a network device is provided, wherein the network device includes: a processor and a transceiver connected to the processor, wherein,
  the transceiver is configured to obtain channel data collection indication information, the channel data collection indication information includes at least one of collection time and data structure information; the data structure information is used to indicate at least one of data type and data format;
  the processor is configured to collect channel data according to the channel data collection indication information to obtain the channel data; the channel data is used to indicate channel state; and
  the transceiver is further configured to transmit the channel data to a second node device.

According to one aspect of the present application, a computer-readable storage medium is provided, and executable instructions are stored in the readable storage medium, and the executable instructions are loaded and executed by a processor to implement the channel data transmission method described in the above aspect.

According to an aspect of an embodiment of the present application, a chip is provided, the chip includes a programmable logic circuit and/or program instructions, and when the chip is operated on a computer device, it is used to realize the channel data transmission method described in the above aspect.

According to one aspect of the present application, a computer program product is provided. When the computer program product is executed on a processor of a computer device, the computer device executes the channel data transmission method described in the above aspect.

BRIEF DESCRIPTION OF THE DRAWINGS

In order to more clearly illustrate the technical solutions in the embodiments of the present application, the drawings that need to be used in the description of the embodiments will be briefly introduced below. Obviously, the drawings in the following description are only some embodiments of the present application. For those skilled in the art, other drawings can also be obtained based on these drawings without creative effort.

DETAILED DESCRIPTION

In order to make the purpose, technical solution and advantages of the present application clearer, the implementation manners of the present application will be further described in detail below in conjunction with the accompanying drawings.

First, a brief introduction to the terminologies involved in the embodiments of this application:

Channel State Information (CSI):

CSI is information for describing channel properties of a communication link. The indication of CSI is very important in the communication system, which determines the performance of multiple-input multiple-output (MIMO) transmission. Generally speaking, the CSI indication in the communication system may include indications of the information such as channel quality indicator (CQI), precoding matrix indicator (PMI), rank indicator (RI), and the like.

Figure 1:
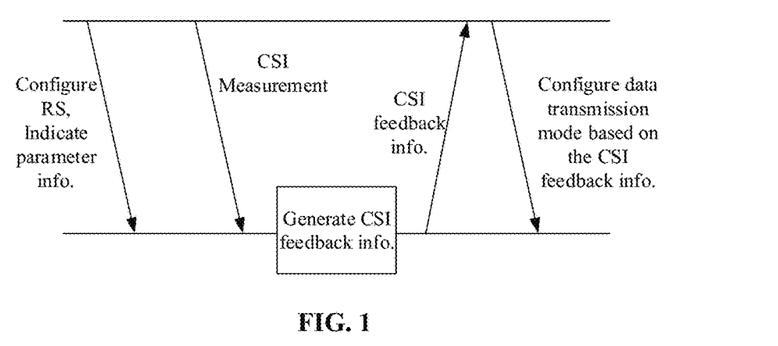
FIG. 1 is a schematic diagram of the generation and indication process of channel state information provided by an exemplary embodiment of the present application.

With reference to FIG. 1, the way of generating and indicating CSI is exemplarily described. As shown in FIG. 1, the network device can configure the indication parameter information for the CSI indication for the terminal equipment, for example: which information among the CQI, PMI, RI and other information the terminal equipment needs to indicate; at the same time, the network equipment can configure for the terminal device some reference signals for CSI measurement, for example: synchronization signal block (SSB) and/or channel state information-reference signal (CSI-RS). The terminal device determines the current channel state information through the measurement of the above reference signal, and indicates the current CSI feedback information to the network device according to the indication parameter information configured by the network device, so that the network device can configure a reasonable and efficient data transfer method based on the current channel condition.

Artificial Intelligence (AI):

In recent years, artificial intelligence research represented by neural networks has achieved great results in many fields, and it will also have an important impact on people's production and life for a long time in the future.

Figure 2:
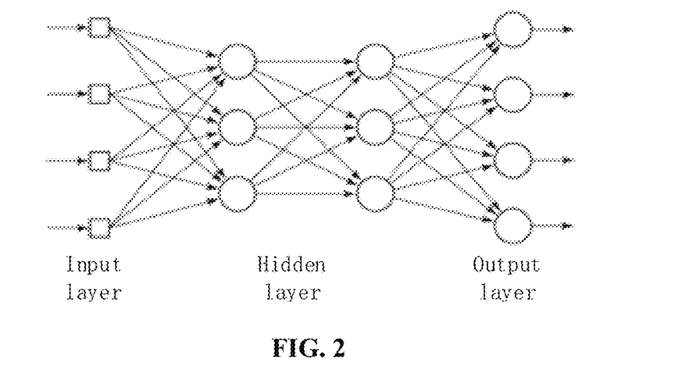
FIG. 2 is a schematic diagram of a neural network provided by an exemplary embodiment of the present application.
Figure 3:
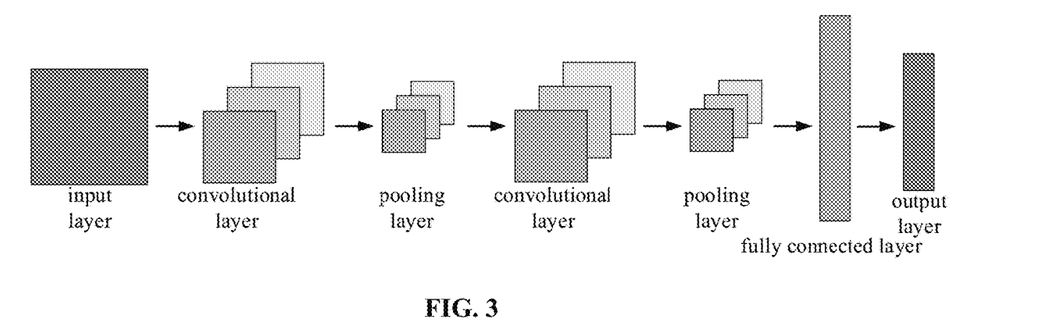
FIG. 3 is a schematic diagram of a convolutional neural network provided by an exemplary embodiment of the present application.

Referring to FIG. 2, a schematic diagram of a neural network provided by an embodiment of the present application is shown. As shown in FIG. 2, the basic structure of a simple neural network includes: an input layer, a hidden layer and an output layer. Among them, the input layer is responsible for receiving data, the hidden layer is responsible for processing data, and the final result is generated in the output layer. As shown in FIG. 3, each node represents a processing unit, which can also be regarded as simulating a neuron. Multiple neurons form a layer of neural network, and multi-layer information transmission and processing constructs an overall neural network.

With the continuous development of neural network research, in recent years, neural network deep learning algorithms have been proposed, more hidden layers have been introduced, and feature learning is performed through layer-by-layer training of neural networks with multiple hidden layers, which greatly improves the learning and processing capabilities of neural networks, and the widely applications in pattern recognition, signal processing, optimization combination, anomaly detection, etc.

At the same time, with the development of deep learning, convolutional neural networks have been further studied. Referring to FIG. 3, a schematic diagram of a convolutional neural network provided by an embodiment of the present application is shown. As shown in FIG. 3, in a convolutional neural network, its basic structure includes: an input layer, multiple convolutional layers, multiple pooling layers, a fully connected layer, and an output layer. The introduction of the convolutional layer and the pooling layer effectively controls the sharp increase of network parameters, limits the number of parameters and taps the characteristics of the local structure, and improves the robustness of the algorithm.

Combination of Channel State Information Indication and Artificial Intelligence

In related technologies, the basic principles of wireless communication systems are mostly based on theoretical modeling and parameter selection of actual communication environments. As the requirements for flexibility, adaptability, speed, and capacity of wireless communication systems are further enhanced, the gains that traditional wireless communication system working methods based on classical model theory can bring are gradually weakening. At present, some new studies have been gradually carried out to address the above problems, and one of which is the use of artificial intelligence to obtain and indicate CSI.

Figure 4:
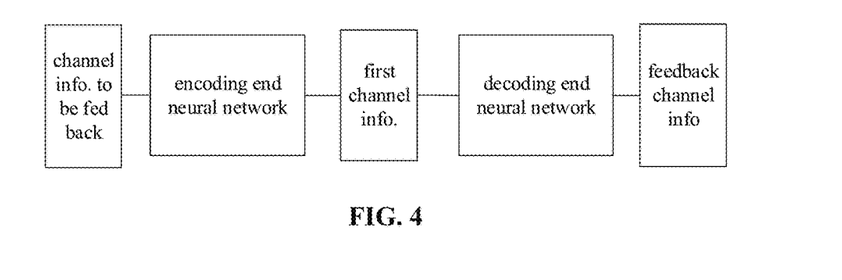
FIG. 4 is a schematic diagram of a network architecture using a neural network model for channel state information indication provided by an exemplary embodiment of the present application.

Referring to FIG. 4, which shows a schematic diagram of a network architecture using a neural network model for channel state information indication provided by an embodiment of the present application. As shown in FIG. 4, the encoding end first invokes the encoding end neural network to encode the feedback channel information to generate the first channel information, which is also the CSI feedback information; after receiving the first channel information, the decoding end invokes the neural network at the decoding end to decode the first channel information to obtain feedback channel information.

In the above artificial intelligence-based CSI feedback method, the size of the first channel information fed back is directly related to the feedback performance. The more the amount of information of the fed back first channel information is, the recovery degree of the corresponding channel information to be fed back at the decoding end is also higher for the feedback channel information corresponding to the decoding end. In this case, there is a contradiction between the feedback overhead of the first channel information and the recovery gain of the channel information to be fed back. On the one hand, from the perspective of communication system overhead, the feedback overhead required to transmit the first channel information needs to be as small as possible; on the other hand, from the perspective of communication system transmission performance gain, the higher the recovery degree of channel information to be fed back at the decoding end is, the more it is beneficial to the performance gain of the communication system.

To sum up, in order to make the feedback channel information obtained through the neural network at the encoding end and the neural network at the decoding end more accurate, it is necessary to perform neural network training on the neural network at the encoding end and the neural network at the decoding end, and it is necessary to collect training data sets, so as to design and determine the obtained channel information, and determine the way to obtain channel information. Also, according to the determined way to obtain channel information, the determined channel information scheme is obtained, and the two issues of what kind of channel information to obtain and how to obtain channel information are determined, so that the training data set can be improved, so as to ensure that the training data set can be used to train and obtain a neural network model with better performance and stronger generalization ability.

In related technologies, there are no specific rules for the obtaining scheme of the training data set, and the collected sample data may be relatively one-sided channel information, which cannot comprehensively train the neural network model of the encoding end and the neural network model of the decoding end. The accuracy of the feedback channel information output by the neural network model obtained training and updating using random collected channel information may be poor.

In view of the above problems, the embodiment of the present application proposes a channel data transmission method, which is mainly used in the CSI feedback process based on artificial intelligence. The neural network model used can use a comprehensive and specific training data set in the model training process, so that the neural network model with better performance and stronger generalization ability is obtained through training, and then it is generated that the feedback channel information recovery degree is higher by inputting the channel information to be fed back, generating the first channel information through the neural network model at the encoding end, and outputting the feedback channel information by inputting the first channel information to the neural network model at the decoding end, which is beneficial to the performance gain of the communication system. Hereinafter, the technical solution of the present application will be described in combination with the following embodiments.

Figure 5:
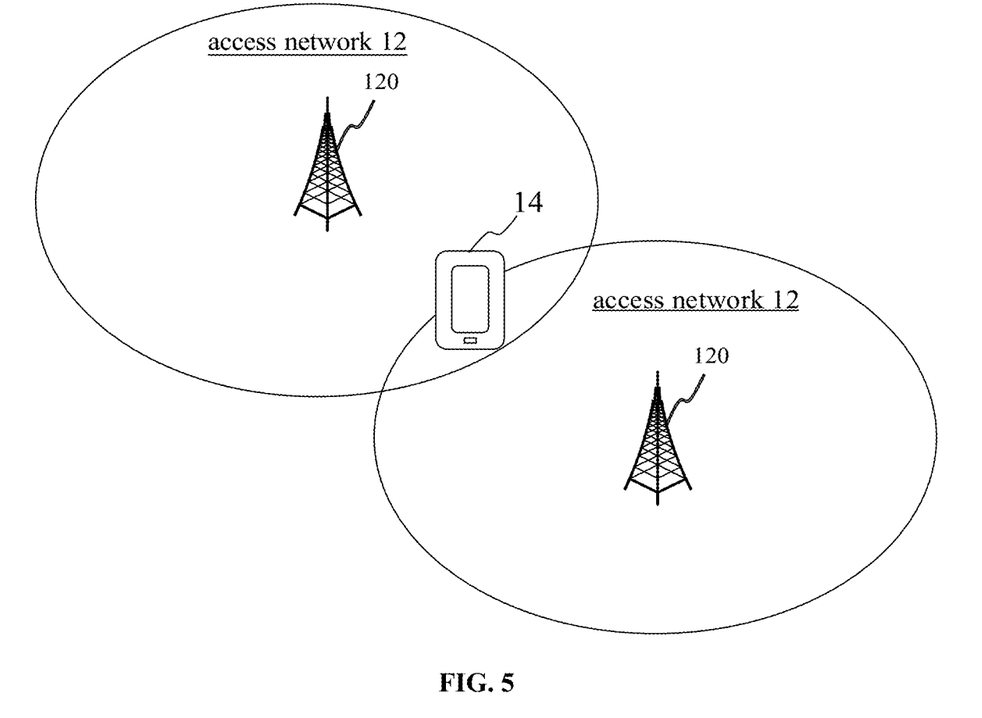
FIG. 5 is a block diagram of a communication system provided by an exemplary embodiment of the present application.

FIG. 5 shows a block diagram of a communication system provided by an exemplary embodiment of the present application. The communication system may include: an access network 12 and a terminal device 14.

The access network 12 includes several network devices 120. The network device 120 may be a base station, and the base station is a device deployed in an access network to provide a wireless communication function for a terminal. The base station may include various forms of macro base stations, micro base stations, relay stations, access points and so on. In systems using different wireless access technologies, the names of devices with base station functions may be different. For example, in LTE systems, they are called eNodeB or eNB; in 5G NR-U systems, they are called gNodeB or gNB. As communications technology evolves, the description "base station" may change. For convenience in this embodiment of the present application, the above-mentioned devices that provide the wireless communication function for the terminal device 14 are collectively referred to as network devices.

The terminal device 14 may include various handheld devices, vehicle-mounted devices, wearable devices, computing devices or other processing devices connected to wireless modems, as well as various forms of user equipment, mobile stations (Mobile Station, MS), terminal (terminal device) and so on, which have wireless communication functions. For convenience of description, the devices mentioned above are collectively referred to as terminals. The network device 120 and the terminal device 14 communicate with each other through a certain air interface technology, such as a Uu interface.

The technical solutions of the embodiments of the present application can be applied to various communication systems, such as: Global System of Mobile Communication (GSM) system, Code Division Multiple Access (CDMA) system, Wideband Code Division Multiple Access (WCDMA) system, General Packet Radio Service (General Packet Radio Service, GPRS), Long Term Evolution (LTE) system, LTE Frequency Division Duplex (FDD) system, LTE Time Division Duplex (TDD) system, Advanced Long Term Evolution (LTE-A) system, New Radio (NR) system, evolution system of NR system, LTE-based access to Unlicensed spectrum (LTE-U) system, NR-U system, Universal Mobile Telecommunication System (UMTS), Worldwide Interoperability for Microwave Access (WiMAX) communication system, Wireless Local Area Networks (WLAN), Wireless Fidelity (WiFi), 6th generation mobile communication technology (6-Generation, 6G) system, next generation communication system or other communication systems, etc.

Generally speaking, the number of connections supported by traditional communication systems is limited and easy to implement. However, with the development of communication technology, mobile communication systems will not only support traditional communication, but also support, for example, Device to Device (D2D) communication, Machine to Machine (M2M) communication, Machine Type Communication (MTC), Vehicle to Vehicle (V2V) communication and Vehicle to Everything (V2X) system, etc. The embodiments of the present application may also be applied to these communication systems.

Figure 6:
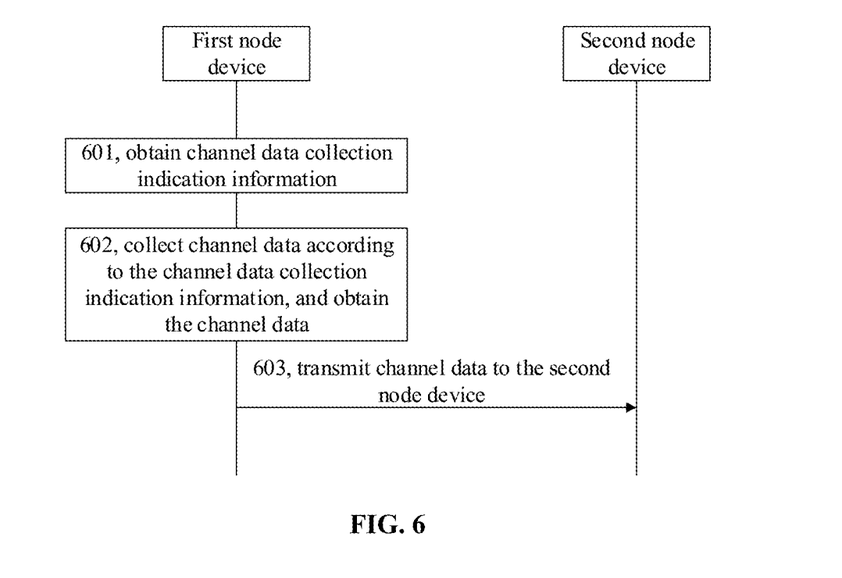
FIG. 6 is a flowchart of a channel data transmission method provided in an exemplary embodiment of the present application.

FIG. 6 shows a flowchart of a channel data transmission method provided by an exemplary embodiment of the present application. The method can be applied to a communication system as shown in FIG. 5, and the method includes:

Step 601, obtain channel data collection indication information.

In this embodiment of the present application, the first node device obtains channel data collection indication information. The first node device is a terminal or a network device. The channel data collection indication information includes at least one of collection time and data structure information, and the data structure information is used to indicate at least one of data type and data format.

In the embodiment, the channel data collection indication information includes at least one of collection time and data structure information. If the channel data collection information only includes collection time, the first node device can perform channel data collection according to the collection time; if the channel data collection information only includes data structure information, at least one of the data type or data format of the channel data to be collected can be determined through the data structure information, and then based on at least one of the determined data type or the data format, the channel data collection is performed; if the channel data collection information includes collection time and data structure information, the channel data corresponding to the determined data structure information will be collected based on the collection time.

In a possible implementation manner, the collection time and the data structure information are obtained separately, or obtained together.

Exemplarily, the collection time is pre-configured by the first node device, the data structure information is configured by other node devices, and the first node device obtains the collection time and data structure information respectively. Alternatively, the collection time is configured by other node devices, the data structure information is pre-configured by the first node device, and the first node device obtains the collection time and data structure information respectively. Alternatively, the collection time and data structure information are both configured by the second node device, and the first node device receives the channel data collection indication information from the second node device.

Step 602, collect channel data according to the channel data collection indication information, and obtain the channel data.

In this embodiment of the present application, the first node device performs channel data collection according to the obtained channel data collection indication information, and the channel data is used to indicate the channel state.

In the embodiment, the channel data may include at least one data type.

Exemplarily, when the channel data contains multiple data types, the channel state is determined through the numerical conditions corresponding to the channel data of each data type.

Step 603, transmit channel data to the second node device.

In this embodiment of the present application, the first node device transmits channel data to the second node device. The second node device is a terminal or a network device.

In this embodiment, the first node device can transmit channel data to the second node device multiple times, and can transmit multiple channel data at one time, so as to achieve the purpose of the second node device obtaining multiple channel data, so as to achieve the purpose of generating data set using the multiple channel data.

In summary, in the method provided in this embodiment, the first node device collects channel data according to the obtained channel data collection indication information, obtains channel data used to indicate the channel state, and transmits the channel data to the second node device, that is to say, the present application provides a channel data collection method based on clear collection time, data type or format, which enables different devices in the system to collaboratively obtain channel data, expands the scope of channel data collection, and improves the subsequent application effect based on channel data. Thereby, the performance gain of the communication system is improved.

The scheme shown in the embodiment of the present application can be applied to the application scenario of performing model training on the neural network at the encoding end and the neural network at the decoding end shown in FIG. 4. The second node device takes the obtained a large amount of sample channel data as the sample channel data, and forms a training data set by obtaining a large amount of sample channel data, and performs model training on the encoding end neural network and the decoding end neural network according to the training data set. Since the sample channel data collected through this scheme can be collected in a larger range, the sample channel data forming the training data set is more comprehensive and specific. Therefore, the neural network model trained by using this training data set has better performance and stronger generalization ability. Furthermore, it is ensured that the recovery degree of the feedback channel data output by the neural network model is high, which is beneficial to the performance gain of the communication system.

Figure 7:
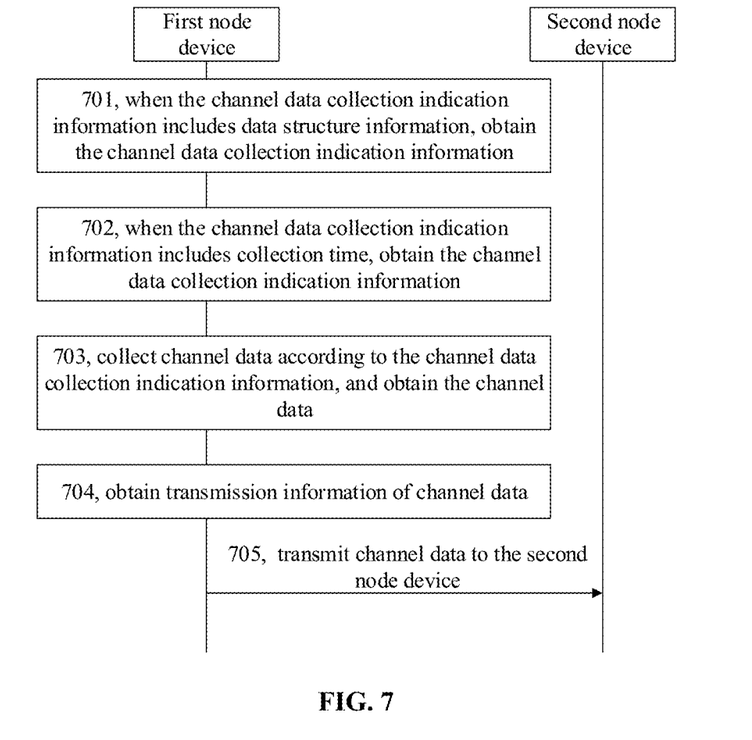
FIG. 7 is a flowchart of a channel data transmission method provided by an exemplary embodiment of the present application.

FIG. 7 shows a flow chart of a channel data transmission method provided by an exemplary embodiment of the present application. The method can be applied to a communication system as shown in FIG. 5, and the method includes:

Step 701, when the channel data collection indication information includes data structure information, obtain the channel data collection indication information.

In this embodiment of the present application, the first node device obtains channel data collection indication information including data structure information.

In the embodiment, the data structure information is used to indicate at least one of data type and data format.

In a possible implementation manner, the first node device receives the data structure information indicated by the control node device through the first signaling. Alternatively, the data structure information determined by the first node device is obtained. Alternatively, data structure information preset in the first node device is obtained.

Exemplarily, the way for the first node device to obtain the data structure information may include the following:
1) The control node device sends the data structure information to the first node device through the first signaling, and the first node device receives the data structure information.
2) There is a specified data structure information generation algorithm in the first node device, and according to the generation algorithm, the data structure information can be determined and obtained after calculation.
3) There is already determined data structure information in the first node device, and the data structure information is obtained directly.

In the embodiment, the control node device is the second node device, or the control node device is other devices than the second node device. The second node device is a terminal or a network device, and the control node device may be a designated terminal or a designated network device.

In a possible implementation manner, when the data structure information is determined by the first node device, or is information preset in the first node device, a second signaling is used to indicate the data structure information to the second node device.

In the embodiment, the second signaling may be transmitted through the same signaling as the information used to trigger channel data collection, or transmitted separately.

In the above case, the data structure information is generated by the first node device, so the second node device cannot obtain the data structure information in the first node device, in order for the second node device to obtain the data structure information in the first node device, the data structure information can be sent by the first node device to the second node device through the second signaling, so that both the second node device and the first node device can obtain the data structure information.

Step 702, when the channel data collection indication information includes collection time, obtain the channel data collection indication information.

In the embodiment of the present application, when the channel data collection indication information includes the collection time, the first node device obtains the collection time.

In the embodiment, the collection time is the time for controlling the first node device to start collecting channel data.

In a possible implementation manner, the first node device receives the collection time indicated by the control node device through a third signaling.

In the embodiment, the control node device is the second node device, or the control node device is other devices than the second node device.

In a possible implementation manner, the third signaling is used to indicate a single collection time; or, the third signaling is used to indicate multiple collection times; or, the third signaling is used to indicate periodic collection time.

Exemplarily, the collection time indicated by the third signaling by the first node device may include the following content:

1) The first node device obtains a single collection time indicated by the third signaling, and the first node device determines a time for one collection of channel data based on the single collection time.
2) The first node device obtains multiple collection times indicated by the third signaling, and the first node device can determine the time for each collection of channel data through the multiple collection times.
3) The first node device obtains the periodic collection time indicated by the third signaling. The periodic collection time can be the first collection time, the time interval between two adjacent collections, and the number of collections. Each time of the periodic channel data collection may be determined by the above information.

In a possible implementation manner, when the channel data collection indication information includes collection time and data structure information, the first node device obtains the collection time and data structure information in the manner shown in step 701 and step 702 respectively.

In a possible implementation manner, when the channel data collection indication information is sent by the terminal, and the first node device is a network device, the channel data collection indication information is transmitted through an uplink. When the channel data collection indication information is sent by the network device, and the first node device is a terminal, the channel data collection indication information is transmitted through a downlink.

Step 703, collect channel data according to the channel data collection indication information, and obtain the channel data.

In the embodiment, the channel data includes a data set with M dimensions; the M dimensions respectively correspond to a data type, and M is an integer greater than or equal to 1. Any dimension in the M dimensions has at least one granularity, and a numerical value corresponding to each granularity is used to indicate the channel quality.

For example, when M=2, a single channel data is a data set with a dimension of 2, which is a two-dimensional matrix. There are P first granularities in the first dimension of the two-dimensional matrix, and there are Q second granularities in the second dimension. P and Q may be equal or unequal, and the specific numerical indication in the matrix represents the quality of the channel.

For another example, when M=3, the single channel data is a data set with a dimension of 3, there are P first granularities in the first dimension of the data set, there are Q second granularities in the second dimension, and there are R third granularities in the third dimension, wherein P, Q, and R may be equal or unequal, and specific numerical indications in the three-dimensional data set represent channel quality.

In a possible implementation manner, the data type includes time domain information, frequency domain information, spatial information, antenna information, or data imaginary and real part information.

In the embodiment, the time domain information includes at least one of time information, delay information, and time domain sampling point number; the granularity corresponding to the time domain information is a specified time granularity. The frequency domain information includes at least one of frequency domain information or frequency domain sampling point number; the granularity corresponding to the frequency domain information is a specified frequency granularity. The spatial information includes angle information; the granularity corresponding to the spatial information is a specified angular granularity. The antenna information includes at least one of transmitting antenna information, receiving antenna information, and transmitting and receiving antenna pairing mode information; the granularity corresponding to the antenna information is at least one of the specified antenna granularity or the pairing granularity formed by specifying the transmitting and receiving antenna pairing mode. The data imaginary and real part information includes real part information and imaginary part information.

Exemplarily, the time domain information includes time information, delay information, time domain sampling point number, etc., and the corresponding time domain information granularity may be a specified time granularity, such as milliseconds, microseconds, or time domain information such as a specified number of time slots, half frames, and frames. The frequency domain information includes frequency information, frequency domain sampling point number, etc., and the corresponding frequency domain information granularity may be a specified frequency granularity. The spatial information includes angle information, for example, angle information of the incident angle, and the corresponding spatial information granularity may be a specified angular granularity. The antenna information includes transmitting antenna information, receiving antenna, pairing information of transmitting antenna and receiving antenna, etc., and the corresponding antenna information granularity is the specified antenna granularity or the pairing granularity formed by specifying the transmitting and receiving antenna pairing mode. The imaginary and real part information of the data means that when the channel data is in the form of a complex number, and the complex number needs to be represented by the real part and the imaginary part, the real part information and the imaginary part information can represent the real part and the imaginary part of the channel data respectively.

Figure 8:
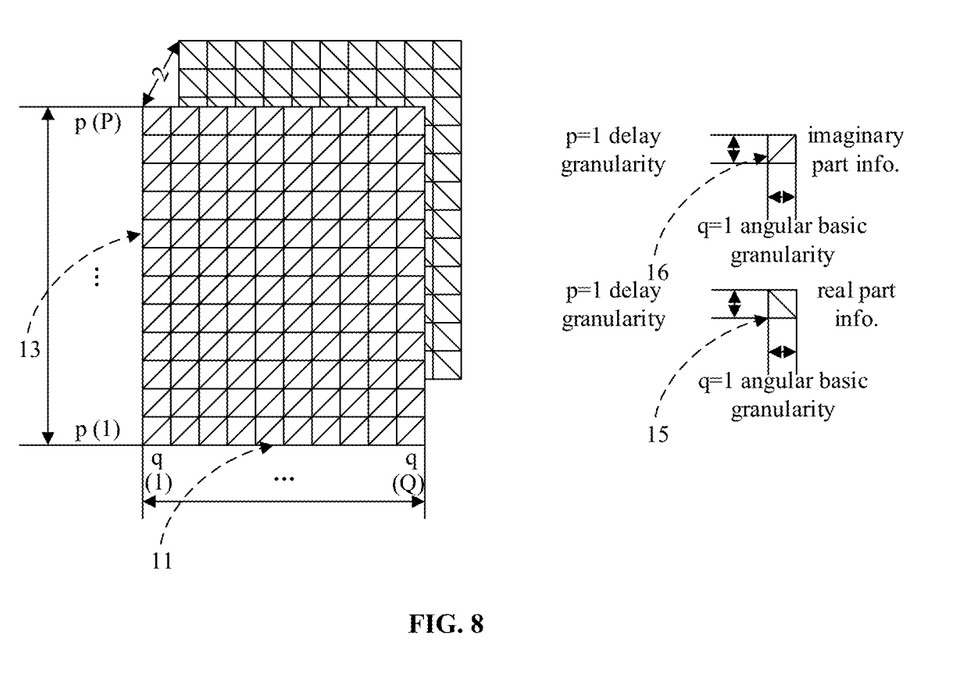
FIG. 8 is a schematic diagram of a single channel data involved in the embodiment shown in FIG. 7.

For example, FIG. 8 is a schematic diagram of a single channel data involved in the embodiment of the present application. As shown in FIG. 8, if a single channel data is a data set with a dimension of 3, the channel data includes three dimensions, wherein the data types corresponding to the three dimensions are time domain information p, spatial information q, and real part and imaginary part information, the channel data can be expressed as a three-dimensional matrix, the corresponding data type in the first dimension is time domain information, corresponding to P first granularities in this dimension, and the corresponding data type in the second dimension is spatial information, there are Q second granularities corresponding to this dimension, and the corresponding data types on the third dimension are real part information and imaginary part information. As shown in FIG. 8, each unit 11 in the horizontal direction indicates a first granularity in the first dimension, and the first dimension has 10 first granularities. Each unit 13 in the vertical direction indicates a second granularity in the second dimension, and the second dimension has 12 second granularities. Each small rectangular unit 15 formed by each unit 11 in the horizontal direction and each unit 13 in the vertical direction respectively indicates the real part information and imaginary part information in the third dimension, wherein each cell located in the front is used to indicate the imaginary part information, and each cell located in the rear is used to indicate the real part information, wherein the imaginary part information has 120 third granularities, and the real part information also has 120 third granularities.

In a possible implementation manner, the channel data includes at least one of collected original channel data and channel data after specified processing is performed on the original channel data.

In the embodiment, the specified processing includes at least one of mathematical transformation processing, and imaginary and real part representation processing.

Exemplarily, the channel data after the specified processing is performed on the original channel data is channel data of a specific length obtained through mathematical transformation processing, and the mathematical transformation processing may be processed through methods such as feature separation and vector space mapping. In addition, the specified processing can also be imaginary and real parts information processing of the data. When the processed channel data is in the form of a complex number and the complex number needs to be represented by the real part and the imaginary part, the real part and the imaginary part of the channel data can be respectively represented by the real part information and the imaginary part information.

Figure 9:
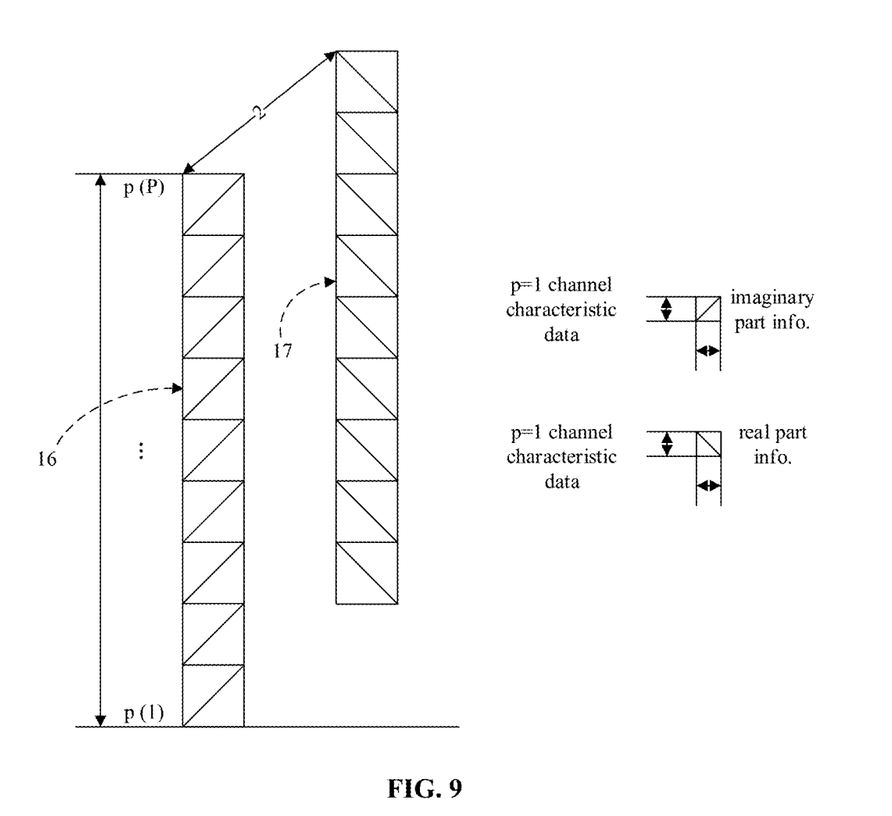
FIG. 9 is a schematic diagram of processed channel data involved in the embodiment shown in FIG. 7.

For example, FIG. 9 is a schematic diagram of processed channel data involved in the embodiment of the present application. As shown in FIG. 9, if the single channel data is the channel data after the specified processing of the original channel data, and the channel data includes two dimensions, which respectively are the processed channel feature vector and real part and imaginary part information. The channel feature vector in the first dimension correspond to P first granularities, wherein each cell 16 located in the front is used to indicate the imaginary part information, and each cell 17 located in the rear is used to indicate the real part information. In addition, the imaginary part information in the second dimension corresponds to P granularities, and the real part information also corresponds to P granularities.

In one possible implementation, the channel data is sample channel data.

In the embodiment, the sample channel data is data for training a channel state prediction model, and the channel state prediction model is a neural network model for predicting a channel state according to input channel data. The channel state prediction model includes the above encoding-end neural network and decoding-end neural network shown in FIG. 4.

Exemplarily, if the obtained channel data is used as sample channel data, the second node device can organize the respective obtained sample channel data to generate a training data set. By configuring the specified channel data collection instruction information, the channel data corresponding to each data type can be collected in batches. Moreover, the data types and data formats contained in the generated training data set are comprehensive and specific. With this training data set, model training is performed on the neural network at the encoding end and the neural network at the decoding end shown in FIG. 4 above, which greatly improves the effect of model training.

Step 704, obtain transmission information of channel data.

In this embodiment of the present application, the first node device obtains transmission information of the channel data, and the transmission information is used to indicate at least one of a transmission mode and a transmission time for the transmission of the channel data to the second node device.

In a possible implementation manner, the transmission information includes at least one of transmission link information and transmission time information. The transmission link information is used to indicate the transmission mode, and the transmission time information is used to indicate the time for channel data transmission.

In the embodiment, when the transmission information includes transmission link information, the transmission link information indicated by the control node device through the fourth signaling is received. In addition, the control node device is the second node device, or the control node device is other devices than the second node device.

For example, the control node device may be a designated terminal or a designated network device.

When the transmission information includes transmission time information, the transmission time information indicated by the control node device through the fifth signaling is received. In addition, the control node device is the second node device, or the control node device is other devices than the second node device.

In a possible implementation manner, the fifth signaling is used to indicate single transmission time information. Alternatively, the fifth signaling is used to indicate multiple times of transmission time information. Alternatively, the fifth signaling is used to indicate periodic transmission time information.

Exemplarily, the first node device obtaining the transmission time indicated by the fifth signaling may include the following content:
1) The first node device obtains the single transmission time information indicated by the fifth signaling, and the first node device determines the time for one transmission of channel data through the single transmission time information.

2) The first node device obtains multiple times of transmission time information indicated by the fifth signaling, and the first node device can determine the time of each transmission channel data through the multiple times of transmission time information.
3) The first node device obtains the periodic transmission time information indicated by the fifth signaling. The periodic transmission time information can be the first transmission time, the time interval between two adjacent transmissions, and the number of transmissions. The time for respective periodic transmission of channel data may be determined according to the above information.

Step 705, transmit channel data to the second node device.

In this embodiment of the present application, the first node device transmits channel data to the second node device.

In a possible implementation manner, the channel data is transmitted to the second node device according to the transmission information.

In the embodiment, a transmission mode for transmitting channel data from the first node device to the second node device is determined according to the transmission link information in the transmission information.

1) When the first node device is a terminal and the second node device is a network device, transmit channel data to the second node device through the designated uplink indicated by the transmission link information.

In the embodiment, the specified uplink includes the uplink for transmitting at least one transmission of uplink control information (UCI), medium access control (MAC) message, radio resource control (RRC) message, and the uplink data information.

For example, the first node device receives the transmission link information through the fourth signaling, and the transmission link information instructs the first node device to use UCI for channel data transmission. When the first node device needs to perform channel data transmission of the collected channel data to the second node device, it transmits corresponding channel data to the second node device through the UCI. Alternatively, the transmission link information may also indicate multiple transmission modes. If the transmission link information indicates that the first node device uses UCI and RRC messages for channel data transmission, then when the first node device needs to perform channel data transmission of the collected channel data to the second node device, it transmits corresponding channel data to the second node device through the UCI and RRC messages.

In a possible implementation manner, when the first node device is a terminal, the first node device transmits channel data to other terminals other than the first node device through a direct communication sidelink link.

That is to say, when the first node device is a terminal and the second node device is also a terminal, the first node device may transmit channel data to the second node device through a direct communication sidelink link.

Figure 10:
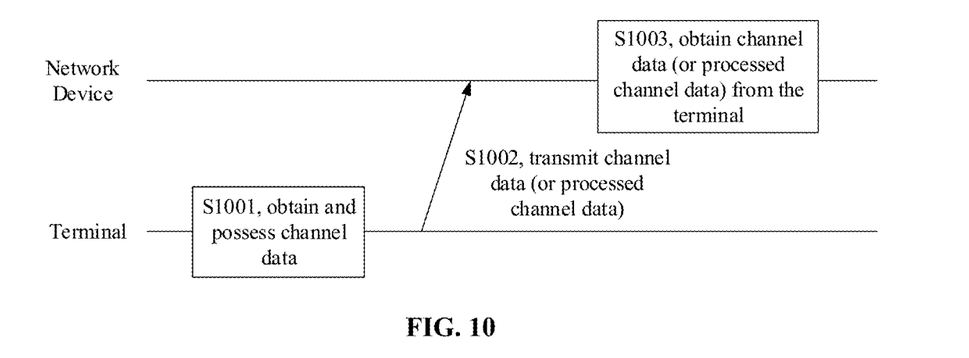
FIG. 10 is a schematic diagram of a channel data transmission process involved in the embodiment shown in FIG. 7.

Exemplarily, FIG. 10 is a schematic diagram of a channel data transmission process involved in the embodiment of the present application. As shown in FIG. 10, if the first node device is a terminal device, the terminal device collects channel data, and can perform specified processing on the channel data (S1001), and transmit the channel data and the processed channel data through one or more uplink transmission mode to the second node device (S1002), and the second node device receives the channel data and the processed channel data (S1003).

2) When the first node device is a network device and the second node device is a terminal, the channel data is transmitted to the second node device through the designated downlink indicated by the transmission link information.

In the embodiment, the specified downlink includes the downlink for transmission of at least one information of the downlink control information (DCI), MAC message, RRC message, broadcast message, system information block (SIB), and downlink data information.

It can be understood that the SIB is a possible implementation form of the broadcast message, and a possible implementation form of the RRC message is RRC reconfiguration signaling.

In a possible implementation manner, when the first node device is a network device, the channel data is transmitted to other network devices other than the first node device through an interface link between the network devices.

That is to say, when the first node device is a network device and the second node device is also a network device, the first node device may transmit channel data to the second node device through the interface link between the network devices.

Figure 11:
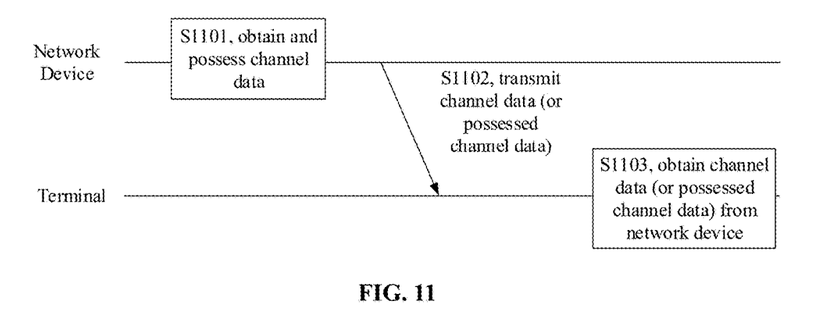
FIG. 11 is a schematic diagram of a channel data transmission process involved in the embodiment shown in FIG. 7.

For example, FIG. 11 is a schematic diagram of a channel data transmission process involved in the embodiment of the present application. As shown in FIG. 11, if the first node device is a network device, the network device collects channel data, and can perform specified processing on the channel data (S1101), and transmits the channel data and the processed channel data to the second node device through one or more downlink (S1102), and the second node device obtains the channel data and processed channel data from the network device (S1103).

Exemplarily, the complete process of the first node device transmitting channel data to the second node device includes that the first node device receives trigger information, wherein the trigger information is used to instruct the first node device to start collecting channel data. Wherein, the trigger information may be transmitted through the first signaling, the third signaling or other signaling. Then, the first node device performs specified channel data collection according to the received channel data collection indication information, and finally transmits the collected channel data to the second node device according to the specified transmission link information and transmission time information.

Figure 12:
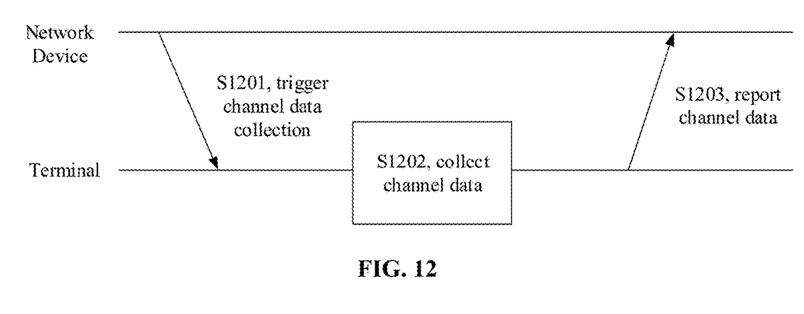
FIG. 12 is a schematic diagram of a single transmission process of channel data involved in the embodiment shown in FIG. 7.

FIG. 12 is a schematic diagram of a single channel data transmission process involved in the embodiment of the present application. As shown in FIG. 12, if the first node device is a terminal and the second node device is a network device, the second node device may transmit information for triggering channel data collection to the first node device (S1201), and the information may be the channel data collection indication information including the collection time and data structure information, the collection time corresponds to a single collection time, the terminal collects the channel data indicated by the data structure information according to the single collection time, and generates the corresponding channel data (S1202), and then according to the obtained transmission link information and transmission time information between the first node device and the second node device, transmit the channel data to the second node device according to the specified transmission link and single transmission time (S1203). If the obtained transmission time information indicates multiple transmission times, the process of transmitting channel data to the second node device multiple times under a single trigger can be implemented.

Figure 13:
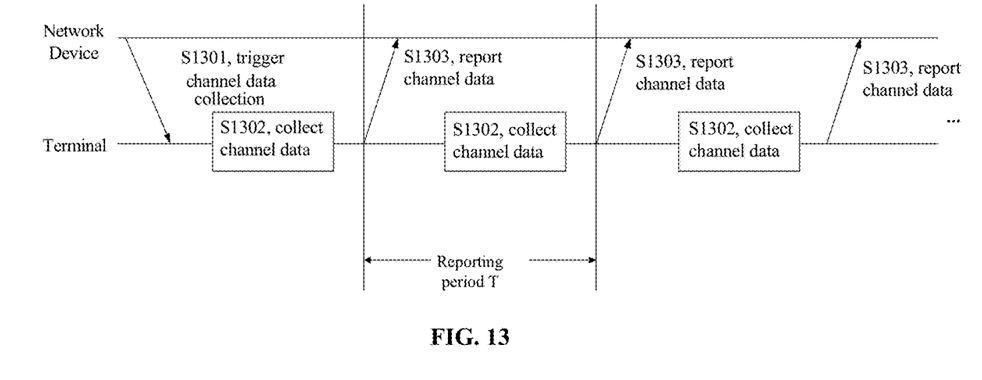
FIG. 13 is a schematic diagram of a process of periodic transmission of channel data involved in the embodiment shown in FIG. 7.

When the collection time indicates the periodic collection time, and the transmission time information indicates the periodic transmission time, FIG. 13 is a schematic diagram of a process of periodic channel data transmission according to the embodiment of the present application. As shown in FIG. 13, if the first node device is a terminal and the second node device is a network device, the second node device may transmit information for triggering channel data collection to the first node device (S1301), and the information may be the channel data collection indication information including the collection time and data structure information, the collection time corresponds to periodic collection time, that is, it can be the initial collection time and the collection cycle time, and the terminal collects the channel data indicated by the data structure information according to the periodic collection time, generates channel data corresponding to each collection time (S1302), and then transmits the channel data to the second node device according to the obtained transmission link information and transmission time information between the first node device and the second node device, and according to the specified transmission link and the periodic transmission time (S1203). Wherein, the periodic transmission time may include the initial transmission time and the reporting period T.

In summary, in the method provided in this embodiment, the first node device collects channel data according to the obtained channel data collection indication information, obtains channel data used to indicate the channel state, and transmits the channel data to the second node device, that is to say, the present application provides a channel data collection method based on clear collection time, data type or format, which enables different devices in the system to collaboratively obtain channel data, expands the scope of channel data collection, and improves the subsequent application effect based on channel data. Thereby, the performance gain of the communication system is improved.

Figure 14:
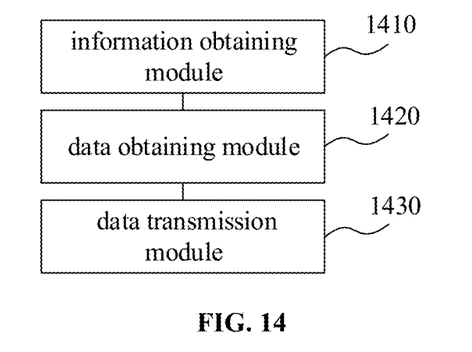
FIG. 14 is a structural block diagram of a channel data transmission device provided by an exemplary embodiment of the present application.

FIG. 14 shows a structural block diagram of a channel data transmission device provided by an exemplary embodiment of the present application. The device can be implemented as a first node device, and the first node device can be a terminal or a network device. The device includes:
  an information obtaining module 1410, configured to obtain channel data collection indication information, wherein the channel data collection indication information includes at least one of collection time and data structure information; the data structure information is used to indicate at least one of data type and data format;
  a data obtaining module 1420, configured to collect channel data according to the channel data collection indication information to obtain the channel data; the channel data is used to indicate channel state; and
  a data transmission module 1430, configured to transmit the channel data to a second node device.

In a possible implementation manner, when the channel data collection indication information includes the data structure information, the information obtaining module 1410 includes:
  a first obtaining submodule, configured to receive the data structure information indicated by a control node device through a first signaling; the control node device is the second node device, or the control node device is other devices than the second node device;
  or
  a second obtaining submodule, configured to obtain the data structure information determined by the first node device;
  or,
  a third obtaining submodule, configured to obtain the data structure information preset in the first node device.

In a possible implementation manner, when the data structure information is determined by the first node device, or is information preset in the first node device, the device further includes:
  an information indicating submodule, configured to indicate the data structure information to the second node device through a second signaling.

In a possible implementation manner, when the channel data collection indication information includes the collection time, the information obtaining module 1410 includes:
  a time receiving submodule, configured to receive the collection time indicated by a control node device through a third signaling;
  wherein, the control node device is the second node device, or, the control node device is other devices than the second node device.

In a possible implementation manner, the third signaling is used to indicate a single collection time;
  or, the third signaling is used to indicate multiple collection times;
  or, the third signaling is used to indicate periodic collection times.

In a possible implementation manner, the device further includes:
  an obtaining submodule, configured to obtain transmission information of the channel data before transmitting the channel data to the second node device, wherein the transmission information includes at least one of transmission link information and transmission time information; and
  the data transmission module 1430 includes:
  a data transmission submodule, configured to transmit the channel data to the second node device according to the transmission information.

In a possible implementation manner, when the transmission information includes the transmission link information, the obtaining module comprises:
  a link obtaining module, configured to receive the transmission link information indicated by a control node device through a fourth signaling;
  wherein, the control node device is the second node device, or, the control node device is other devices than the second node device.

In a possible implementation manner, the data transmission submodule includes:
  an uplink transmission unit, configured to, when the first node device is a terminal and the second node device is a network device, transmit the channel data to the second node device through a designated uplink indicated by the transmission link information.

In a possible implementation manner, the designated uplink includes an uplink used to transmit at least one of UCI, MAC message, RRC message, and uplink data information.

In a possible implementation manner, the device further includes:
  a direct transmission unit, configured to transmit the channel data to other terminals other than the first node device through a direct communication sidelink.

In a possible implementation manner, the data transmission submodule includes:
  a downlink transmission unit, configured to, when the first node device is a network device and the second node device is a terminal, transmit the channel data to the second node device through a designated downlink indicated by the transmission link information.

In a possible implementation manner, the designated downlink includes a downlink for transmitting at least one of DCI, MAC message, RRC message, broadcast message, SIB, and downlink data information.

In a possible implementation manner, the device further includes:
an interface transmission unit, configured to transmit the channel data to other network devices other than the first node device through an interface link between network devices.

In a possible implementation manner, when the transmission information includes the transmission time information, the obtaining module includes:
a time receiving submodule, configured to receive the transmission time information indicated by the control node device through a fifth signaling;
wherein, the control node device is the second node device, or, the control node device is other devices than the second node device.

In a possible implementation manner, the fifth signaling is used to indicate single transmission time information;
or, the fifth signaling is used to indicate multiple transmission time information;
or, the fifth signaling is used to indicate periodic transmission time information.

In a possible implementation manner, the channel data includes a data set with M dimensions; each of the M dimensions corresponds to a data type; M is an integer greater than or equal to 1; and
any dimension in the M dimensions has at least one granularity; a value corresponding to each granularity is used to indicate channel quality.

In a possible implementation manner, the data type comprises time domain information, frequency domain information, spatial information, antenna information or data imaginary and real part information.

In a possible implementation manner, the time domain information includes at least one of time information, delay information, and time domain sampling point number; the granularity corresponding to the time domain information is a specified time granularity.

In a possible implementation manner, the frequency domain information includes at least one of frequency domain information or frequency domain sampling point number; the granularity corresponding to the frequency domain information is a specified frequency granularity.

In a possible implementation manner, the spatial information includes angle information; the granularity corresponding to the spatial information is a specified angular granularity.

In a possible implementation manner, the antenna information includes at least one of transmitting antenna information, receiving antenna information, and information; the granularity corresponding to the antenna information is at least one of a specified antenna granularity or pairing granularities formed by specifying the sending and receiving antenna pairing mode.

In a possible implementation manner, the imaginary and real part information of the data includes real part information and imaginary part information.

In a possible implementation manner, the channel data includes at least one of collected original channel data and channel data after specified processing is performed on the original channel data.

In a possible implementation manner, the specified processing includes:
at least one of mathematical transformation processing, and imaginary and real part representation processing.

In a possible implementation manner, the channel data is sample channel data; the sample channel data is data used to train a channel state prediction model, and the channel state prediction model is a neural network model used to predict channel state from input channel data.

In summary, in the method provided in this embodiment, the first node device collects channel data according to the obtained channel data collection indication information, obtains channel data used to indicate the channel state, and transmits the channel data to the second node device, that is to say, the present application provides a channel data collection method based on clear collection time, data type or format, which enables different devices in the system to collaboratively obtain channel data, expands the scope of channel data collection, and improves the subsequent application effect based on channel data. Thereby, the performance gain of the communication system is improved.

Figure 15:
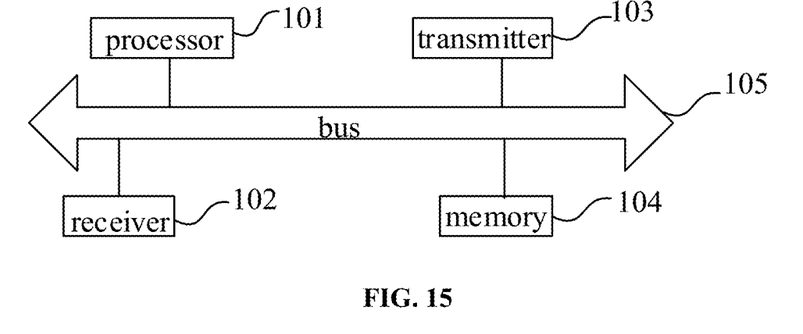
FIG. 15 is a schematic structural diagram of a communication device provided by an exemplary embodiment of the present application.

FIG. 15 shows a schematic structural diagram of a communication device (terminal device or network device) provided by an exemplary embodiment of the present application. The communication device includes: a processor 101, a receiver 102, a transmitter 103, a memory 104 and a bus 105.

The processor 101 includes one or more processing cores, and the processor 101 executes various functional applications and information processing by running software programs and modules.

The receiver 102 and the transmitter 103 can be implemented as a communication component, which can be a communication chip, denoted as a transceiver.

The memory 104 is connected to the processor 101 through the bus 105.

The memory 104 may be used to store at least one instruction, and the processor 101 is used to execute the at least one instruction, so as to implement various steps in the foregoing method embodiments.

In addition, the memory 104 can be implemented by any type of volatile or non-volatile storage device or their combination. The volatile or non-volatile storage device includes but not limited to: magnetic disk or optical disk, Electrically-Erasable Programmable Read Only Memory (EEPROM), Erasable Programmable Read Only Memory (EPROM), Static Random Access Memory (SRAM), Read-Only Memory (ROM), Magnetic Memory, Flash Memory, Programmable Read-Only Memory (PROM).

In the embodiment, when the communication device is implemented as a terminal device, the processor and the transceiver in the communication device involved in the embodiment of the present application may perform the steps performed by the above terminal device in any of the methods shown in FIG. 6 to FIG. 13, which will not be repeated here.

In a possible implementation manner, when the communication device is implemented as a terminal device,
the transceiver is configured to obtain channel data collection indication information, the channel data collection indication information includes at least one of collection time and data structure information; the data structure information is used to indicate at least one of data type and data format;
the processor is configured to collect channel data according to the channel data collection indication information to obtain the channel data; the channel data is used to indicate channel state; and the transceiver is further configured to transmit the channel data to the second node device.

In the embodiment, when the communication device is implemented as a network device, the processor and the transceiver in the communication device involved in the embodiment of the present application may execute the steps performed by the above network device in any of the methods shown in FIG. 6 to FIG. 13, which will not be repeated here.

In a possible implementation manner, when the communication device is implemented as a network device, the transceiver is configured to obtain channel data collection indication information, the channel data collection indication information includes at least one of collection time and data structure information; the data structure information is used to indicate at least one of data type and data format;

the processor is configured to collect channel data according to the channel data collection indication information to obtain the channel data; the channel data is used to indicate channel state; and the transceiver is further configured to transmit the channel data to the second node device.

In an exemplary embodiment, a computer-readable storage medium is also provided, the computer-readable storage medium stores at least one instruction, at least one piece of program, a code set or an instruction set, the at least one instruction, the at least one piece of program, the code set or instruction set is loaded and executed by the processor to implement the channel data transmission method performed by the communication device provided in the above method embodiments.

In an exemplary embodiment, a chip is also provided, the chip includes a programmable logic circuit and/or program instructions, and when the chip is run on a computer device, it is used to realize the channel data transmission method described in the above aspect.

In an exemplary embodiment, there is also provided a computer program product, which, when running on a processor of a computer device, causes the computer device to execute the channel data transmission method described in the above aspect.

Those of ordinary skill in the art can understand that all or part of the steps for implementing the above embodiments can be completed by hardware, and can also be completed by instructing related hardware through a program. The program can be stored in a computer-readable storage medium. The above-mentioned storage medium may be a read-only memory, a magnetic disk or an optical disk, and the like.

The above are only optional embodiments of the application, and are not intended to limit the application. Any modifications, equivalent replacements, improvements, etc. made within the spirit and principles of the application shall be included in the protection scope of the present application.

What is claimed is:

1. A channel data transmission method, wherein the method is used for a first node device, and the method comprises:

obtaining channel data collection indication information, wherein the channel data collection indication information comprises at least one of collection time and data structure information; the data structure information is used to indicate at least one of data type and data format;

collecting channel data according to the channel data collection indication information to obtain the channel data; the channel data is used to indicate channel state; and transmitting the channel data to a second node device.

2. The method according to claim 1, wherein when the channel data collection indication information comprises the data structure information, the obtaining channel data collection indication information comprises:

receiving the data structure information indicated by a control node device through a first signaling; the control node device is the second node device, or the control node device is other devices than the second node device; or obtaining the data structure information determined by the first node device; or, obtaining the data structure information preset in the first node device.

3. The method according to claim 2, wherein when the data structure information is determined by the first node device, or is information preset in the first node device, the method further comprises:

indicating the data structure information to the second node device through a second signaling.

4. The method according to claim 1, wherein when the channel data collection indication information comprises the collection time, the obtaining channel data collection indication information comprises:

receiving the collection time indicated by a control node device through a third signaling;

wherein, the control node device is the second node device, or, the control node device is other devices than the second node device.

5. The method according to claim 4, wherein one of the following:

the third signaling is used to indicate a single collection time;

the third signaling is used to indicate multiple collection times;

the third signaling is used to indicate periodic collection times.

6. The method according to claim 1, wherein before transmitting the channel data to the second node device, the method further comprises:

obtaining transmission information of the channel data, wherein the transmission information comprises at least one of transmission link information and transmission time information; and wherein the transmitting the channel data to the second node device comprises:

transmitting the channel data to the second node device according to the transmission information.

7. The method according to claim 6, wherein when the transmission information comprises the transmission link information, the obtaining the transmission information of the channel data comprises:

receiving the transmission link information indicated by a control node device through a fourth signaling;

wherein, the control node device is the second node device, or, the control node device is other devices than the second node device.

8. The method according to claim 7, wherein when the transmission information comprises the transmission time information, the obtaining the transmission information of the channel data comprises:
receiving the transmission time information indicated by the control node device through a fifth signaling;
wherein, the control node device is the second node device, or, the control node device is other devices than the second node device.

9. The method according to claim 8, wherein one of the following:
the fifth signaling is used to indicate single transmission time information;
the fifth signaling is used to indicate multiple transmission time information;
the fifth signaling is used to indicate periodic transmission time information.

10. The method according to claim 1, wherein the channel data comprises a data set with M dimensions; each of the M dimensions corresponds to a data type; M is an integer greater than or equal to 1; and
any dimension in the M dimensions has at least one granularity; a value corresponding to each granularity is used to indicate channel quality.

11. The method according to claim 10, wherein the data type comprises time domain information, frequency domain information, spatial information, antenna information or data imaginary and real part information.

12. The method according to claim 1, wherein the channel data comprises at least one of collected original channel data and channel data after specified processing is performed on the original channel data.

13. The method according to claim 12, wherein the specified processing comprises:
at least one of mathematical transformation processing, and imaginary and real part representation processing.

14. The method according to claim 1, wherein the channel data is sample channel data; the sample channel data is data used to train a channel state prediction model, and the channel state prediction model is a neural network model used to predict channel state from input channel data.

15. A channel data transmission device, which is used for a first node device, and the device comprises a processor, a memory and a transceiver connected by a bus, wherein memory is used to store at least one instruction, and the processor is used to execute the at least one instruction, and execution of the instruction causes the channel data transmission device to:
obtain channel data collection indication information, wherein the channel data collection indication information comprises at least one of collection time and data structure information; the data structure information is used to indicate at least one of data type and data format;
collect channel data according to the channel data collection indication information to obtain the channel data; the channel data is used to indicate channel state; and
transmit the channel data to a second node device.

16. The device according to claim 15, wherein when the channel data collection indication information comprises the data structure information, the execution of the instruction causes the channel data transmission device to:
receive the data structure information indicated by a control node device through a first signaling; the control node device is the second node device, or the control node device is other devices than the second node device; or
obtain the data structure information determined by the first node device; or,
obtain the data structure information preset in the first node device.

17. The device according to claim 16, wherein when the data structure information is determined by the first node device, or is information preset in the first node device, the execution of the instruction causes the channel data transmission device to:
indicate the data structure information to the second node device through a second signaling.

18. The device according to claim 15, wherein when the channel data collection indication information comprises the collection time, the execution of the instruction causes the channel data transmission device to:
receive the collection time indicated by a control node device through a third signaling;
wherein, the control node device is the second node device, or, the control node device is other devices than the second node device.

19. The device according to claim 18, wherein one of the following:
the third signaling is used to indicate a single collection time;
the third signaling is used to indicate multiple collection times;
the third signaling is used to indicate periodic collection times.

20. The device according to claim 15, wherein the execution of the instruction causes the channel data transmission device to:
obtain transmission information of the channel data before transmitting the channel data to the second node device, wherein the transmission information comprises at least one of transmission link information and transmission time information; and
transmit the channel data to the second node device according to the transmission information.

* * * * *